Patented Nov. 13, 1934

1,980,227

UNITED STATES PATENT OFFICE 1,980,227

FRICTION FACING AND COMPOSITION OF MATTER

Daniel Repony, Clifton, N. J., assignor to Raybestos-Manhattan, Inc., Passaic, N. J., a corporation of New Jersey No Drawing. Application December 22, 1933, Serial No. 703,600

9 Claims. (Cl. 106—23)

This invention relates to a novel composition of matter particularly adapted for the manufacture of friction facings such as brake blocks, clutch facings, brake linings, and the like, and novel products adapted for such use. More particularly, the invention relates to a dry composition combining friction material and binder in such proportions that the products molded therefrom, particularly friction facings, are, or are adapted to become, sufficiently porous to prevent blistering if the friction material is overheated.

The modern trend in design of automotive vehicles has placed more and more severe demands upon the friction materials used in brakes and clutches. The increased capacity for speed, improved roads, free wheeling, increased tire sizes, with consequent reduction in brake diameter, have all combined to place more and more severe demands upon friction materials used in braking. Under the severe conditions to which these materials are subjected, the inadequacy of the old types of brake linings have been forcibly brought out. Particular difficulty has been found in preventing squealing, hardening (i. e., polishing of the surface of the lining by wear, so that greater and greater pedal pressure is required to effect deceleration), fading out (i. e., softening of the binder in the lining under heat, with a slippage of the brake, due to the lubricating effect of the softened binder), and blistering of the lining due to decomposition of the binder or other organic matter in the lining under frictional heat.

These inadequacies of known linings result from recognized limitations imposed by the known methods of manufacture. Thus, with woven linings, the binder can be incorporated only by impregnating or by spreading a layer onto the surface of the woven fabric. In a molded lining as heretofore made, the binder has always been incorporated in plastic or fused form or in solution, so as to coat the fibres of asbestos so far as possible, and thereby to completely cement them together. Uniform spreading of binders in this manner requires an amount of binder which at the least may be sufficient to cause trouble with blistering or fading out, or even if the binder should be sufficiently reduced to avoid these troubles, the material is molded into a dense mass which tends to polish and/or squeal when put into service.

I have now discovered that all of these difficulties can be avoided by the use of a comminuted binder, e. g., such as ground tire scrap, used in such small proportions, as compared with the asbestos and/or other dry friction materials, that the binder does not completely coat the friction materials, but cements them together at spaced points, leaving between the particles of binder unfilled voids, so that the product resulting from molding of this material is porous and may, without serious reduction of strength, contain a smaller proportion of binder than has been commercially practicable in other types of molded friction materials. Friction facings made in this way do not polish, and therefore retain their friction characteristics without so-called hardening. Furthermore, when ground rubber, such as tire scrap is used, the spaced particles of rubber between the fibres, even though vulcanized to the hard rubber stage, actually serve as cushions, giving the brake a more efficient and satisfactory action. Blistering cannot occur with this type of facing, because of its porosity, which permits the free escape of any gases resulting from thermal decomposition of the rubber, or of any other organic material in the composition.

In actual service, linings made according to the present invention have proven themselves far superior, under the most trying conditions, to the best linings made prior to my invention.

In contrast to the known methods of making friction facings from plastic, fused or dissolved binders, my invention contemplates friction facings made in the true sense with a dry molding composition. According to my invention, the rubber or other binder, e. g., tire scrap, is pulverized and mixed with asbestos fiber or other friction material in a dry, non-adhesive condition. I prefer to use soft vulcanized rubber for this purpose, because it has less tendency than raw rubber to fuse and flow during the subsequent vulcanization step, and it is easier, therefore, to obtain a thoroughly porous product in which the fine pieces of rubber retain their identity to a substantial degree.

The mixing may be performed by sifting, stirring, or tumbling together, as in the case of any dried, powdery material, and the resulting mixture may, in this way, be made substantially homogeneous. I shall use the word "stirring" herein to refer generally to such intermingling of the finely divided materials.

In the preferred procedure according to my invention, scrap rubber containing a relatively large proportion of fiber, such as automobile tires, rubber shoes, etc., are ground in any well known manner to a fine state of subdivision.

I prefer to use a ground scrap containing organic fibre, because this fibre tends to increase the porosity of friction facings made therefrom. For example, in the brake lining made according to my invention from ground tires or other rubber fibre composition and asbestos or other refractory friction material any heating which will decompose the rubber, also tends to decompose the fibres; and the charring of the fibres leaves open passageways for the escape of gases. Thus, blistering can be substantially prevented by the use of sufficient organic fibre, even in relatively dense compositions containing higher proportions of rubber or other organic binder than are recommended in the preferred embodiment of my invention.

As one example of how my invention may be utilized, I may take 20 parts of ground automobile tires containing 65% of rubber composition and 35% of fibre, and mix these with 7 lbs. of sulphur and 60 lbs. of short asbestos fibre. When these materials have been thoroughly mixed, a layer of the mixture about two and one-half times as thick as the thickness desired in the final product is placed in a mold, preferably of the follower type. The mold is placed in a heated press and subjected to a pressure of approximately 1000 lbs. per square inch, at a temperature of about 300° F., for a period of about two hours. The resulting product is strong, dense, and accurately conforms in size and shape to that of the mold in which it is vulcanized. The molded facings may be ground to a smooth, accurate surface, as is common in the manufacture of molded brake linings, etc.

As another example of a preferred manner in which my invention may be practiced, I may take 10 parts of ground automobile tires ground fine enough to pass a twenty mesh screen, composed of 65% rubber compound and 35% fibre, and mix this with ten parts of phenol formaldehyde resin powdered fine enough to pass a one hundred mesh screen and sixty parts of asbestos fibre and four parts of sulphur. These ingredients are mixed together, e. g., in a tumbling drum similar to a concrete mixer, until uniformly intermingled. The mass of the resulting dry fibrous floc may be placed in a flat follower type mold, approximately 2½ or 3 times the thickness of the compressed and molded slab which it is desired to obtain. This mold is placed in a heated platen press and pressed for about five minutes at a temperature of about 300° F., and under pressure of about 2,000 lbs. per square inch. The resulting slabs may be cut into strips slightly wider than the brake linings desired, and these strips may then be ground to substantially accurate dimensions.

At this stage the rubber compound has not yet been completely vulcanized to the hard rubber stage. The strips may therefore be bent to arcuate or other shape, as desired, and may then be given the final vulcanization treatment by which the rubber compound is converted to hard rubber, e. g., by heating for two hours at 300° F. This final vulcanization need not be carried out in a press, but preferably is effected in clamping molds which mold the strips during vulcanization in the shape which is given them before the final vulcanizing.

Although the examples specifically set forth above represent a particularly advantageous embodiment of my invention, it is to be understood, of course, that many changes may be made without departing from the scope of my invention. Although it is most desirable to use scrap rubber, and particularly scrap from rubber articles containing organic fibre, it is nevertheless entirely possible to use other binders, e. g., raw rubber, in my invention, first converting it into substantially non-adhesive form and then grinding it. Since raw rubber at ordinary temperatures is too sticky and plastic to be satisfactorily pulverized, it must be treated to render it non-adhesive and preferably non-plastic. In some cases this may be accomplished by chilling the rubber until it becomes substantially brittle. Ordinarily, however, it is more desirable to mix the rubber with sulphur, with or without other ingredients, and to partially vulcanize the rubber to the stage in which it is non-adhesive and capable of grinding. When the process is started with raw rubber, the entire amount of sulphur necessary for vulcanizing to hard rubber may be added at the beginning and initial vulcanizing treatment continued only long enough to produce soft vulcanized rubber.

Where the rubber which is pulverized does not already contain organic fibre, it is advantageous to add fibre such as ground rags or the like to the pulverized mixture. Any other desired ingredients, among which may be fillers like barytes, graphite, litharge or vulcanizing agents including accelerators, activators, etc., or softeners or additional binders such as resins, natural or synthetic, such as phenol resins, may be added at the same time and thoroughly mixed with the other ingredients. Liquid ingredients may also be added at this time, but preferably after the powdered materials have been thoroughly mixed with each other.

At least a partial vulcanization of the mixture should be carried out at relatively high pressure, so that the particles of rubber may be made thoroughly to adhere to and form a strong bond for the asbestos fibre. To some extent the degree of porosity may be regulated by the degree of pressure used. With a lower molding pressure, the particles of rubber can be welded together or to the fibres without fully compacting the mass, so that larger voids are left between the fibres than if a higher molding pressure were used.

Other changes and modifications which will be evident to those skilled in the art are included within the scope of this application, as well as those specifically enumerated above.

What I claim as new is:

1. A dry comminute molding composition comprising asbestos fibre and ground tire scrap in a minor proportion such that the product resulting from dry molding and vulcanizing is characterized by an incomplete covering of the fibers by the rubber and a resulting porosity throughout the mass.

2. A dry comminute molding composition comprising asbestos fibre and a dry comminute binder, the proportion of binder being insufficient to completely coat the fibres or to completely fill the voids between the fibres, whereby the product resulting from dry molding and vulcanizing with heat and pressure is characterized by porosity throughout.

3. A dry comminute molding composition as defined in claim 2, in which the binder includes a comminute resin and comminute rubber, and vulcanizing ingredients therefor.

4. A dry comminute molding composition as defined in claim 2, which includes vulcanized rubber as a binder, and vulcanizing ingredients sufficient to convert the rubber to hard rubber.

5. A dry comminute molding composition adapted for manufacture of friction facings and the like which comprises short fibre asbestos, powdered friction materials, vulcanizing ingredients, and a dry comminute binder including rubber, the amount of binder being insufficient to completely coat the fibres, and being distributed so that upon molding and vulcanizing with heat and pressure, the fibres will be cemented together only at spaced points and the resulting product will be porous.

6. A dry comminute molding composition comprising ground tire scrap including soft-vulcanized rubber and organic fibre, and asbestos fibre in amount larger than that of the ground rubber, the rubber being in amount sufficient to bind the fibres into a strong coherent mass, but only at spaced points along the fibres, so that the resulting product is porous.

7. A friction facing material comprising a hard, compressed and vulcanized mixture comprising unwoven asbestos fibre and a dry comminute binder, the proportion of binder being insufficient to fill the void between the fibers, and the binder being in discrete particles which remain substantially separate and spaced from one another in the compressed and vulcanized product whereby said material is characterized by porosity throughout.

8. A friction facing material comprising a hard, porous mass of friction material, being a compressed mixture of unwoven friction material and binder, the predominant constituent of which is asbestos fiber, and the binder being in lesser amount insufficient to fill the voids between the fibers, being in discrete particles which serve both to bind the asbestos fibers together and to space them slightly apart and said particles being spaced apart along the fibers so that open spaces are left between the fibers for the escape of gases.

9. A friction facing material comprising a hard, porous mass of friction material, being a compressed mixture of unwoven friction material and rubber, asbestos fiber predominating in said mixture and the rubber being in lesser amount insufficient to fill the voids between the fibers, being in discrete particles between the asbestos fibers and adhering thereto and being spaced apart along the fibers so that open spaces are left between for escape of gases and to allow cushioning deformation of the rubber particles.

DANIEL REPONY.